United States Patent [19]
Nishimura

[11] Patent Number: 5,861,998
[45] Date of Patent: Jan. 19, 1999

[54] DRIVING MECHANISM FOR A PHOTOGRAPHIC LENS

[75] Inventor: Syunji Nishimura, Ohmiya, Japan

[73] Assignee: Fuji Photo Optical Co., Ltd., Japan

[21] Appl. No.: 920,282

[22] Filed: Aug. 26, 1997

[30] Foreign Application Priority Data

Sep. 2, 1996 [JP] Japan .................................... 8-248478

[51] Int. Cl.$^6$ ............................................... G02B 15/14
[52] U.S. Cl. ........................ 359/694; 359/699; 359/700
[58] Field of Search .................................. 359/694, 695, 359/699, 700, 701, 823

[56] References Cited

U.S. PATENT DOCUMENTS

| | | | |
|---|---|---|---|
| 5,276,552 | 1/1994 | Kohmoto et al. | 359/601 |
| 5,287,137 | 2/1994 | Hara et al. | 354/195.12 |
| 5,343,331 | 8/1994 | Kohmoto et al. | 359/823 |
| 5,535,057 | 7/1996 | Nomura et al. | 39/694 |
| 5,583,595 | 12/1996 | Hara et al. | 396/76 |
| 5,659,810 | 8/1997 | Nomura et al. | 396/72 |
| 5,758,205 | 5/1998 | Hara et al. | 396/79 |
| 5,812,325 | 9/1998 | Nomura et al. | 359/700 |

FOREIGN PATENT DOCUMENTS

| | | |
|---|---|---|
| 7-128567 | 5/1995 | Japan . |
| 9-113788 | 5/1997 | Japan . |

*Primary Examiner*—Georgia Epps
*Assistant Examiner*—Ricky Mack
*Attorney, Agent, or Firm*—Price, Heneveld, Cooper, DeWitt & Litton

[57] ABSTRACT

A zoom lens driving mechanism is disclosed that is adapted to rotate a first driving lens barrel and a second driving lens barrel relative to each other and thereby to move a movable lens barrel back and forth in parallel to an optical axis. More specifically, a linearly movable member that is provided to guide a linear movement of the movable lens barrel relative to the second driving lens barrel, is moved back and forth under a guidance by a leading groove formed in the first driving lens barrel. With such a unique arrangement, no part is required to support the linearly movable member, and therefore, any apprehension about the strength of a part as well as a flare phenomenon can be avoided.

20 Claims, 6 Drawing Sheets

DRIVING MECHANISM FOR A PHOTOGRAPHIC LENS

BACKGROUND OF THE INVENTION

1. Field of the Invention

The present invention relates to a driving mechanism for a photographic lens adapted to move the photographic lens back and forth in parallel to an optical axis for power varying or focusing.

2. Description of the Related Art

As photographic cameras become more popular, marketing trends require that cameras be more and more compact, thin, and lightweight and simultaneously contain a power varying mechanism such as a zoom mechanism or focus change-over mechanism. The power varying mechanism functions to move the photographic lens back and forth in a direction parallel to an optical axis, for example, to move the photographic lens forward with respect to a camera body for telephoto and move the photographic lens back toward the camera body for wide-angle or standard photo. Thus, a lens barrel holding the photographic lens is moved back and forth relative to the camera body in parallel to the optical axis.

In order to assure that the photographic lens can be moved within a given range to obtain a desired magnification while making the camera as thin as possible, the lens barrel assembly must be constructed with four stages of which three stages can be successively moved. More specifically, the lens barrel assembly must be constructed so that a first driving lens barrel is movable back and forth relative to a stationary lens barrel, a second driving lens barrel is movable back and forth relative to the first driving lens barrel, and a movable lens barrel holding a part of the photographic lens is movable back and forth relative to the second driving lens barrel. By adopting such arrangement, it is possible to limit a length of the lens barrel assembly in the direction of the optical axis approximately to a length of the stationary lens barrel and to obtain a moving range of the photographic lens approximately corresponding to three times the length of the stationary lens barrel. The respective stages of the lens barrel assembly must keep the photographic optical system in a predetermined optical relationship during their movement.

A driving mechanism to move the lens barrel assembly back and forth utilizing a cam barrel is also well-known and the above-mentioned arrangement can be adopted in such a driving mechanism. However, a length of the cam will be unacceptably increased to assure an adequate moving range of the lens barrel assembly while making the camera body as thin as possible. Consequently, a cam slit must be formed in the lens barrel assembly over its fill length, resulting in an apprehension that the strength of the lens barrel assembly might be unacceptably decreased. Particularly, with the photographic lens employing a mechanism adapted to perform the operation of power varying and focusing from a single power source for the economical reasons, the cam's length is increased resulting in a decrease in the cam's strength. To avoid such an inconvenience, a cam groove having a bottom, instead of a cam in the form of a through-hole, has been adopted as the cam formed in the lens barrel assembly.

However, the driving mechanism formed with the previously-described cam groove having the bottom suffers from the following problem. With the conventional mechanism utilizing the cam slit formed in the lens barrel assembly to drive the photographic lens, a pin member interlocked with the cam slit is operatively associated with the cam slits of two lens barrel stages, one serving to guide a movement in parallel to the optical axis and the other serving to regulate a distance of this movement. With the driving mechanism adopting the cam in the form of a groove having a bottom, on the other hand, it is impossible for the pin member to extend through the lens barrel assembly and therefore, in addition to the lens barrel assembly formed with the cam groove, a driving ring member or the like must be provided to control a direction as well as a distance of the pin member's movement.

It is also well-known from Japanese Patent Application Disclosure Gazette No. 1995-128567 to move one driving lens barrel back and forth in parallel to the optical axis without rotation around the optical axis and to rotate the other lens barrel about the optical axis to thereby move it back and forth in parallel to the optical axis so that a front lens group holding frame may be moved back and forth in parallel to the optical axis as the other lens barrel rotates.

In the case of a triple-stage zoom lens barrel assembly described in Japanese Patent Application Disclosure Gazette No. 1995-128567, a stationary lens barrel comprises inner and outer barrels between which a rotatable barrel is disposed. Such barrel assembly of double structure correspondingly enlarges the outer diameter of the lens barrel assembly and limits the possibility of making the camera compact.

In view of the problem described above, the applicant of the present application has already developed and proposed a driving mechanism for a photographic lens that is improved so that additional use of parts such as a rotatable barrel or a driving ring as well as adoption of the lens barrel assembly of dual-structure can be avoided while still realizing a more compact camera (Japanese Patent Application No. 1995-295942 and U.S. patent application Ser. No. 08/733,401). The driving mechanism for photographic lens disclosed in this prior patent application is characterized in that a movable lens barrel is moved back and forth as a second driving lens barrel, which telescopically receives therein the movable lens barrel, is rotated. The second driving lens barrel is moved back and forth as a first driving lens barrel, which telescopically receives therein the second driving lens barrel, and is rotated relative to the second driving lens barrel. The first driving lens barrel is moved back and forth relative to a stationary lens barrel, which telescopically receives therein the first driving lens barrel, as the first driving lens barrel is rotated. A second linearly movable member that is provided to prevent the movable lens barrel from being rotated, is moved back and forth together with the second driving lens barrel. A first linearly movable member that is provided to prevent the second linearly movable member from being rotated, is moved back and forth together with the first driving lens barrel.

However, the driving mechanism for a photographic lens disclosed in the above-mentioned patent application adopts an arrangement such that the second linearly movable member is guided by the first linearly movable member and, as a result, may suffer from the following problem. Specifically, the first linearly movable member is combined with the second linearly movable member so that their portions to guide and their portions to be guided define together a common cylinder. More specifically, the respective linearly movable members basically comprise cylindrical bodies and each of them is circumferentially divided so as to form an appropriate number of openings and keys. The keys of the first linearly movable member are received by the respective openings of the second linearly movable member. Thus, a distal end of the first linearly movable member is circumferentially discontinuous due to the presence of the openings and the keys are supported on a proximal end of the first linearly movable member in a cantilever fashion. Additionally, both the first linearly movable member and the second linearly movable member must be disposed within the lens barrel assembly and, for this reason, their thickness must be as thin as possible. In consequence, the first linearly movable member is problematic due to its lack of strength, and there is an apprehension that this member might be damaged due to fatigue.

Further, the first linearly movable member is operatively associated with a rear end of the first driving lens barrel and with the stationary lens barrel so that the first linearly movable member is reliably prevented from being rotated. Such arrangement necessarily results in a situation that the keys of the first linearly movable member lie adjacent the plane of photographic film. The keys lie inside the lens barrel assembly and therefore adjacent the optical axis. Thus, there is an apprehension that the keys of the first linearly movable member might cause an undesirable flare phenomenon.

SUMMARY OF THE INVENTION

In view of the problems described above, it is a principal object of the invention to improve the previously-proposed driving mechanism for a photographic lens and thereby to provide a driving mechanism for a photographic lens that eliminates any problems associated with weak parts and the undesirable flare phenomenon. The object set forth above is achieved, according to the invention, by a driving mechanism for a photographic lens of a photographic optical system that moves the photographic lens back and forth in parallel to an optical axis for power variation or focusing. The driving mechanism comprises a stationary lens barrel; a first driving lens barrel telescopically received by the stationary lens barrel so as to be moved back and forth relative to the stationary lens barrel in parallel to the optical axis as the first driving lens barrel is rotated around the optical axis; a second driving lens barrel telescopically received by the first driving lens barrel so as to be rotated around the optical axis under a moment of rotation provided from the first driving lens barrel, thereby to be moved back and forth relative to said first driving lens barrel and to move a rear lens group back and forth in parallel to the optical axis by a predetermined distance; a linearly movable member operatively associated with the first driving lens barrel so as to be moved back and forth together with the second driving lens barrel in parallel to the optical axis without being rotated; rotation transmitting means serving to transmit a rotation of the first driving lens barrel to the second driving lens barrel; and a movable lens barrel telescopically received by the second driving lens barrel and adapted to be guided in operative association with the linearly movable member so as to be moved back and forth together with a front lens group in parallel to the optical axis by a predetermined distance as the second driving lens barrel is rotated.

The first driving lens barrel is moved back and forth relative to the stationary lens barrel as the first driving lens barrel is rotated. The second driving lens barrel is moved back and forth relative to the first driving lens barrel as the second driving lens barrel is rotated relative to the first driving lens barrel. Rotation of the second driving lens barrel causes the movable lens barrel to be moved back and forth relative to the second driving lens barrel. The movable lens barrel is always guided by the linearly movable member, since the linearly movable member is moved back and forth together with the second driving lens barrel. With an arrangement such that the first driving lens barrel, second driving lens barrel, and movable lens barrel are moved back and forth in the same direction, the photographic lens can be moved back and forth between a position at which the lens barrel assembly has been extended to its maximum length and a position at which the lens barrel assembly has been shortened to its minimum length. In this manner, the photographic lens can be moved back and forth over a large extent and thereby a high power variation rate can be obtained. In addition, the lens barrel assembly may comprise four lens barrels and therefore the respective lens barrels can be dimensioned to be as short as possible in the direction of the optical axis.

Of various mechanisms to drive the photographic lens in parallel to the optical axis, one of the mechanisms particularly suitable for implementation of the invention uses helicoids for operative association between the stationary lens barrel and the first driving lens barrel, between the first driving lens barrel and the second driving lens barrel, and between the second driving lens barrel and the movable lens barrel, respectively. The first driving lens barrel includes cam means formed in its inner peripheral surface and the linearly movable member is provided with an interlocking member adapted to be operatively associated with the cam means so that the interlocking member is guided by the cam means and thereby the linearly movable member is moved back and forth in parallel to the optical axis.

The cam means is configured so that the interlocking member is linearly moved in operative association with the cam means in parallel to the optical axis as the first driving lens barrel is rotated relative to the stationary lens barrel. Preferably, the cam means is provided in the form of a leading groove, since the leading groove can be easily formed in a simplified configuration.

The leading groove may be formed so as to have a lead corresponding to a distance over which the second driving lens barrel is moved back and forth per each revolution of the first driving lens barrel relative to the second driving lens barrel.

Preferably, the groove defining the cam means is formed so as to be deeper than a female helicoid formed in the inner peripheral surface of the first driving lens barrel. For the case in which the lens barrel assembly is driven by the helicoids and the cam means is provided in the form of a cam groove or a leading groove, a depth of the cam groove or leading groove is preferably dimensioned to be different from a depth of the female groove and, more preferably, the cam groove or leading groove is formed radially beyond a bottom of the female helicoid's trough.

The rotation transmitting means causes the second driving lens barrel to be rotated in a direction opposite to the direction in which the first driving lens barrel is rotated. By rotating the first and second driving lens barrels in opposite directions, these lens barrels are rotated relative to each other. To obtain a relative rotation of these two lens barrels by rotating them in the same direction, they must be rotated at revolution speeds which are different from each other. On the other hand, these two lens barrels may be rotated at the same revolution speed as long as they are rotated in opposite directions.

The rotation transmitting means adapted to rotate the first driving lens barrel and the second driving lens barrel in opposite directions preferably comprises an internal gear formed in an inner surface of the first driving lens barrel, a first transmission gear operatively associated with the internal gear via an intermediate gear, a second transmission gear provided coaxially with the first transmission gear so as to be rotated synchronously with the first transmission gear, and an internal gear formed in the inner surface of the second driving lens barrel so as to be engaged with the second transmission gear.

The intermediate gear serves to rotate the first driving lens barrel and the first transmission gear in opposite directions. Rotation of the first driving lens barrel is transmitted via the second transmission gear and the internal gear to the second driving lens barrel which is then rotated in the same direction as the first transmission gear. Thus, the direction in which the second driving lens barrel is rotated is opposite to the direction in which the first driving lens barrel is rotated.

These and other features, advantages, and objects of the present invention will be further understood and appreciated by those skilled in the art by reference to the following specification, claims, and appended drawings.

DETAILED DESCRIPTION OF THE EMBODIMENT

Details of the inventive driving mechanism for a photographic lens will be more fully understood from the description of a preferred embodiment given hereunder in reference with the accompanying drawings. While the invention will be described hereunder specifically with respect to the case in which this driving mechanism is used to drive a zoom lens system of a built-in type, it should be understood that the driving mechanism of the invention can be used also to drive a zoom lens system of an interchangeable type. The zoom lens system of built-in type can be conveniently driven by using an electric motor as will be described. For the zoom lens system of interchangeable type, on the other hand, it is also possible to achieve a desired zooming effect manually, instead of using the electric motor.

Figure 1:
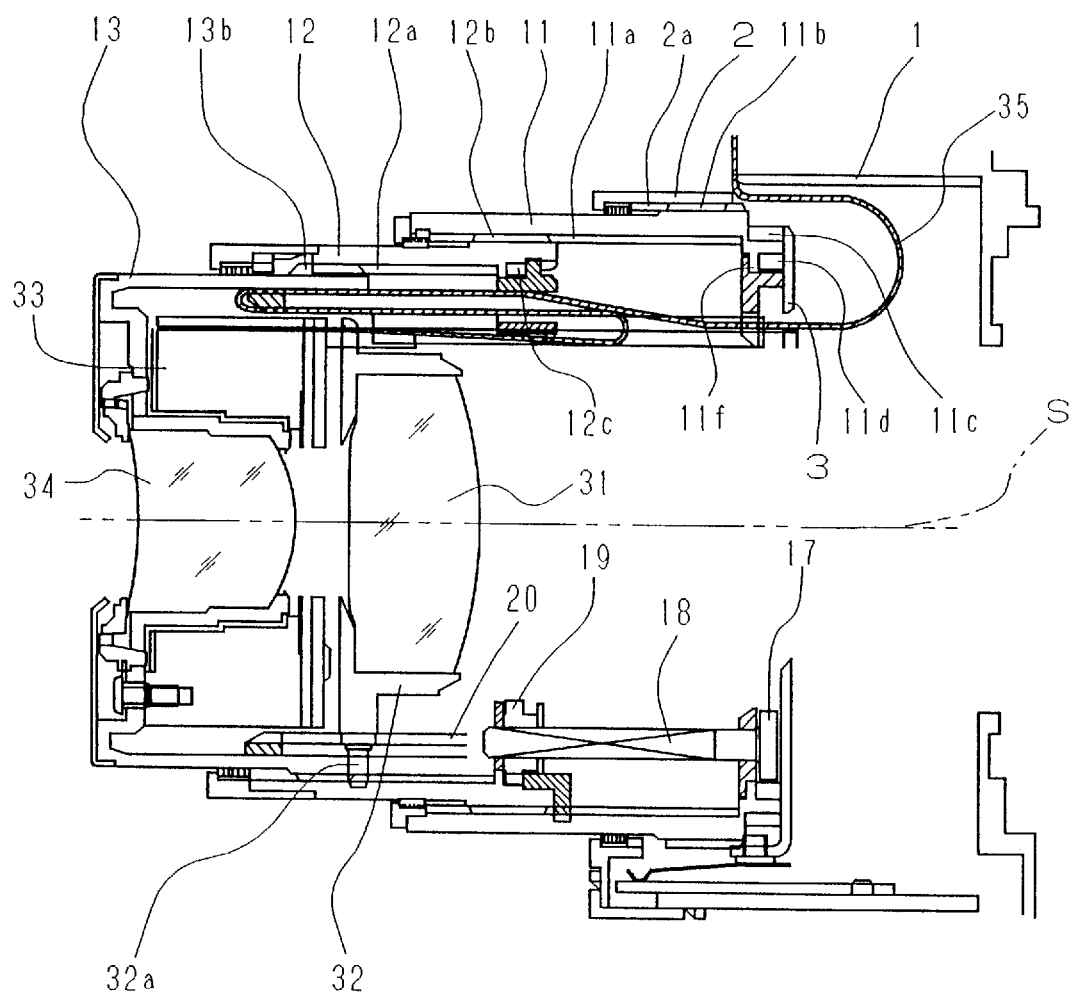
FIG. 1 is a sectional view taken along a plane including an optical axis S, showing an optical system incorporated with a driving mechanism of the invention as a photographic lens having been moved to its foremost position for effective photographing.
Figure 2:
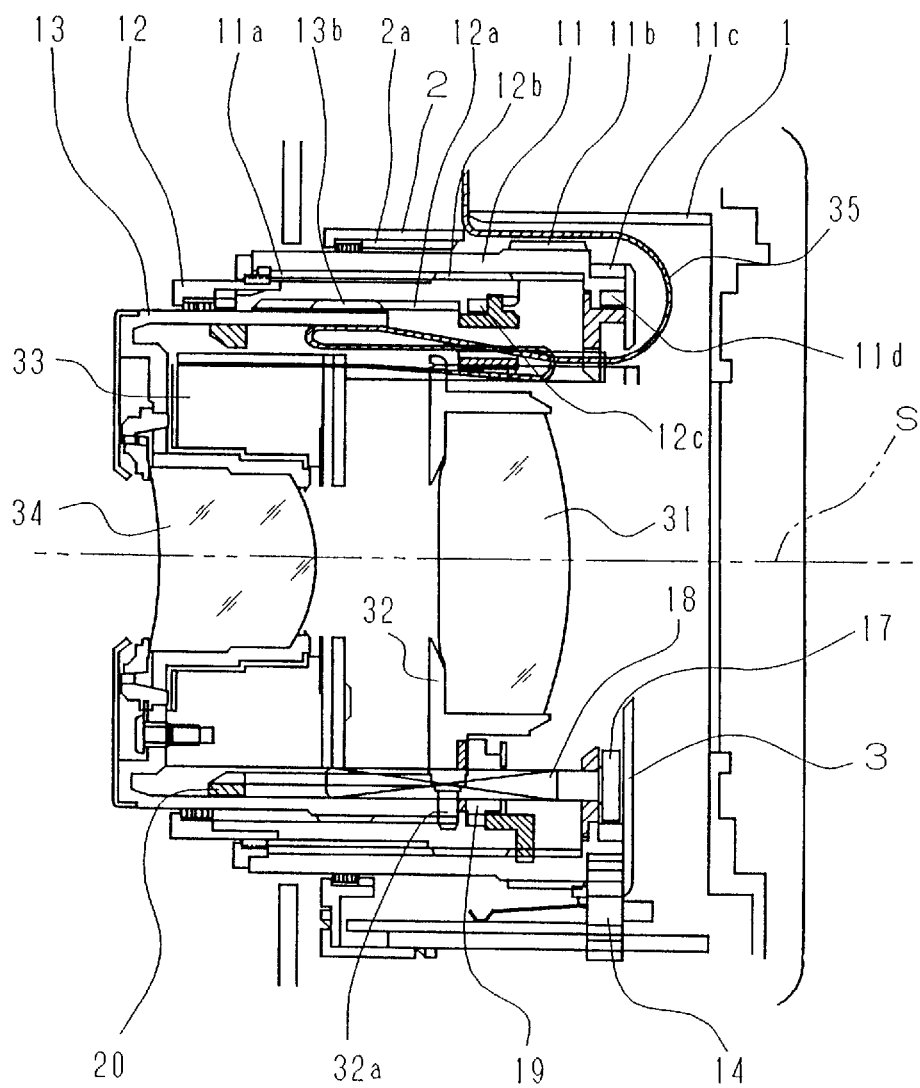
FIG. 2 is a view similar to FIG. 1 showing the same optical system but as the photographic lens having been moved to its rearmost position for effective photographing.
Figure 3:
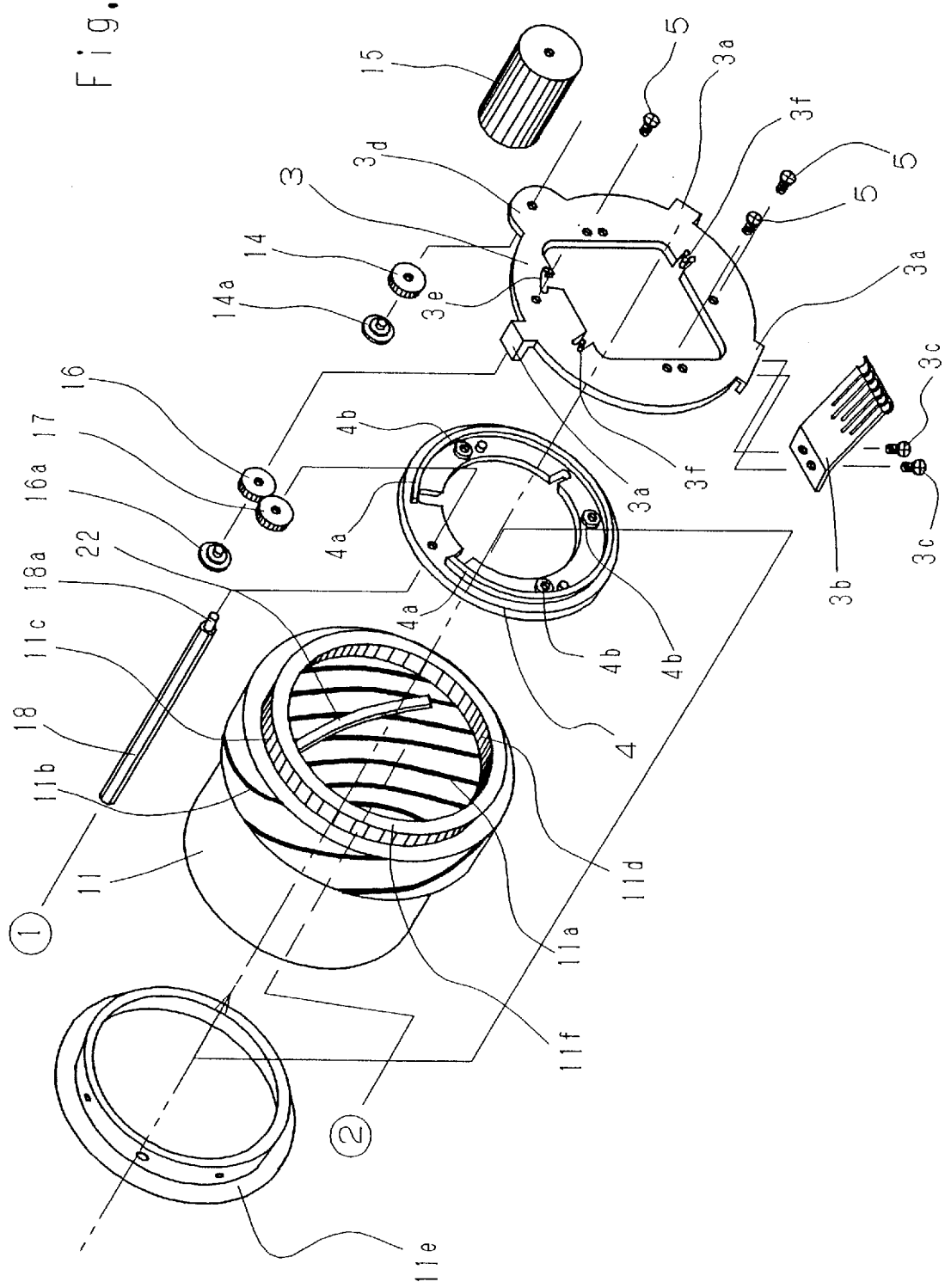
FIG. 3 is an exploded perspective view showing a first driving lens barrel of the inventive driving mechanism.
Figure 4:
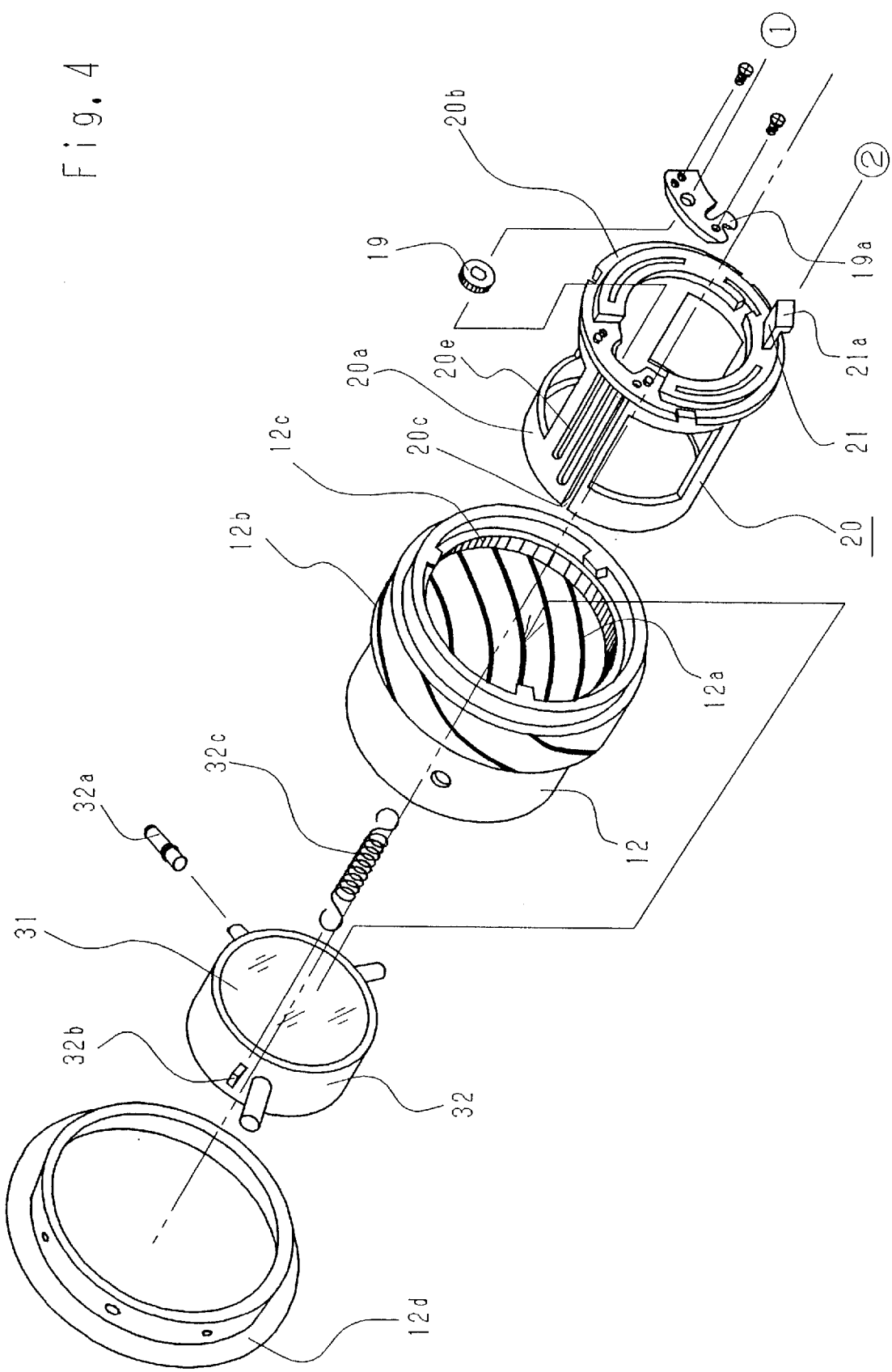
FIG. 4 is a view similar to FIG. 3 showing a second driving lens barrel of the inventive driving mechanism.
Figure 5:
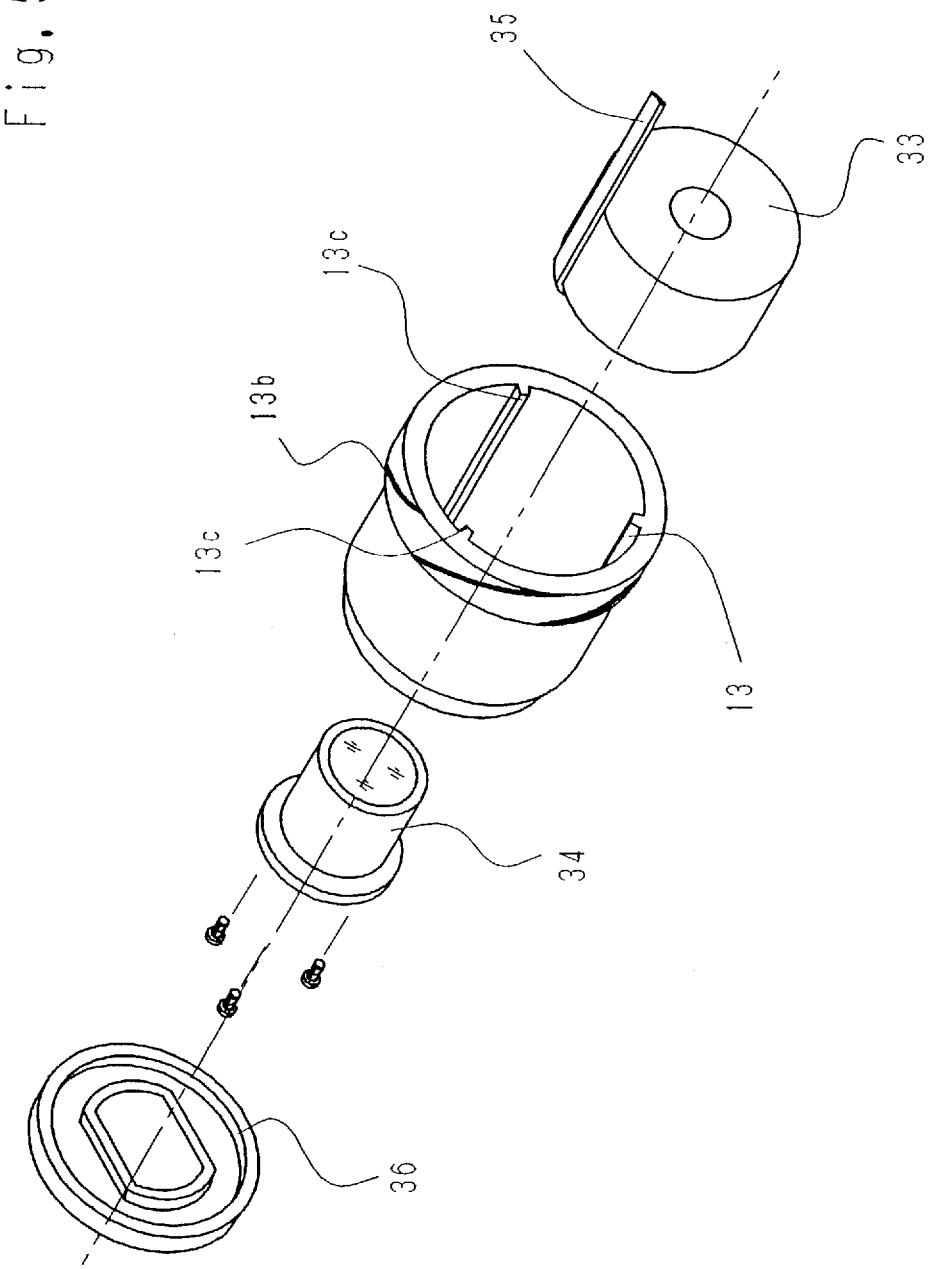
FIG. 5 is a view similar to FIG. 3 showing a movable lens barrel of the inventive driving mechanism.

FIGS. 1 and 2 are sectional views taken along the plane including the optical axis S, respectively showing the optical system provided with the driving mechanism of the present invention with the photographic lens having been moved to its foremost and rearmost positions for effective photographing. It should be understood that, if desired, there additionally may be provided a mechanism by which the photographic lens can be further retracted relative to the position shown in FIG. 2 until a lens barrel assembly substantially sinks in a camera body 1. FIGS. 3–5 are exploded perspective views, respectively showing the important components of the driving mechanism. A stationary lens barrel 2 provided integrally with the camera body 1 telescopically receives therein a first driving lens barrel 11. A female helicoid 2a formed in inner peripheral surface of the stationary lens barrel 2 is operatively associated with a male helicoid 11b formed on outer peripheral surface of the first driving lens barrel 11 in the proximity of its rear end. Thus, rotation of the first driving lens barrel 11 around the optical axis S relative to the stationary lens barrel 2 causes said first driving lens barrel 11 to be moved back and forth relative to stationary lens barrel 2 in parallel to the optical axis S at a predetermined rate of movement. It should be understood that a rear portion of the stationary lens barrel 2 is not shown in detail to avoid a complexity of illustration.

First driving lens barrel 11 telescopically receives therein a second driving lens barrel 12. A female helicoid 11a formed in inner peripheral surface of the first driving lens barrel 11 is operatively associated with a male helicoid 12b formed on outer peripheral surface of second driving lens barrel 12 in the vicinity of its rear end. Thus, rotation of this second driving lens barrel 12 around the optical axis S relative to the first driving lens barrel 11 causes second driving lens barrel 12 to be moved back and forth relative to first driving lens barrel 11 along the optical axis S at a predetermined rate of movement. Second driving lens barrel 12, in turn, telescopically receives therein a movable lens barrel 13. A female helicoid 12a formed in inner peripheral surface of the second driving lens barrel 12 is operatively associated with a male helicoid 13b. In this manner, rotation of second driving lens barrel 12 around the optical axis S causes movable lens barrel 13 to be moved back and forth in parallel to the optical axis S relative to second driving lens barrel 12 at a predetermined rate of movement.

Figure 6:
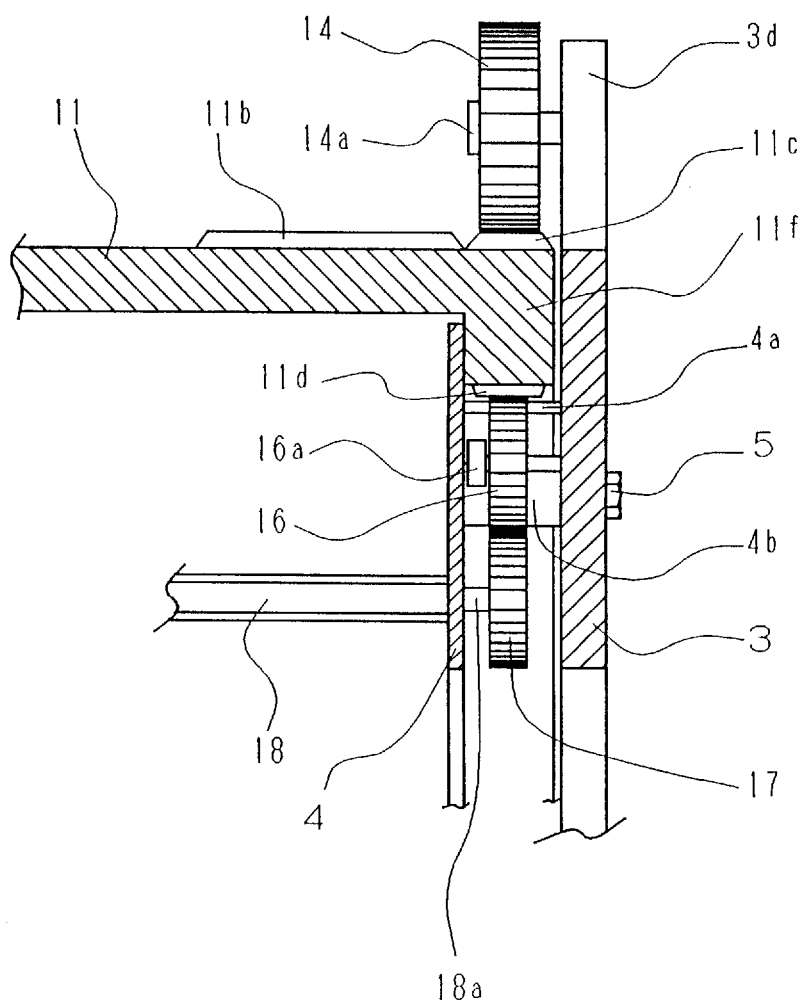
FIG. 6 is a fragmentary scale-enlarged sectional view schematically showing a part of FIG. 1 to illustrate the important components of the inventive driving mechanism.

A gear supporting disk 3 having a central aperture is associated with a rear end of first driving lens barrel 11. As shown in FIG. 6, the rear end of the first driving lens barrel 11 is formed with a flange 11f extending inward. This flange 11f is supported between gear supporting disk 3 and a retaining disk 4 with flange 11f appropriately spaced from gear supporting disk 3. More specifically, retaining disk 4 is formed on its rear surface with a boss 4a in the form of a circular arc extending in parallel with and slightly spaced from outer peripheral edge of disk 4. Immediately inside boss 4a, the retaining disk 4 is formed with screw seats 4b. The portion of retaining disk 4 extending outside boss 4a is put against inner surface of flange 11f while gear supporting disk 3 is positioned outside flange 11f, leaving a small gap as has previously been described. Set screws 5 are threaded through the disk 3 into the respective screw seats 4b and thereby flange 11f is supported between the retaining disk 4 and the gear supporting disk 3. In this manner, rotation of the first driving lens barrel 11 causes neither the gear supporting disk 3 nor the retaining disk 4 to be rotated.

Referring to FIG. 3, gear supporting disk 3 is formed on its outer periphery with guide tongues 3a adapted to extend through corresponding slits (not shown) formed in the stationary lens barrel 2 longitudinally thereof, i.e., in parallel to the optical axis S. The outer surface of each guide tongue 3a is slidably received by the corresponding slit and is flush with the outer peripheral surface of the stationary lens barrel 2. In this way, the gear supporting disk 3 is prevented from rotating around the optical axis S but movable back and forth in parallel to the optical axis S together with the first driving lens barrel 11. One of the guide tongues 3a carries a contact 3b fixed thereto by a set screw 3c. This contact 3b forms a part of an encoder which serves to detect a position of the first driving lens barrel 11 along the optical axis S. The gear supporting disk 3 is additionally formed with a protrusion 3d radially extending outward from its outer periphery at an appropriate location. The stationary lens barrel 2 is correspondingly formed with a slit (not shown) longitudinally thereof, i.e., in parallel to the optical axis S so as to slidably receive protrusion 3*d*.

The first driving lens barrel 11 has a gear 11*c* formed on its outer peripheral surface around its rear end, as shown in FIGS. 1–3 as well as FIG. 6. Gear 11*c* is adapted to be engaged with an input gear 14, as shown in FIGS. 2 and 3 as well as FIG. 6. This input gear 14 is rotatably supported on protrusion 3*d* of the gear supporting disk 3 by a supporting pin 14*a*. Input gear 14 is engaged with a driving gear 15 having a face width adequately large in the direction of the optical axis S to maintain input gear 14 and driving gear 15 in engagement with each other even when input gear 14 is moved back and forth together with the first driving lens barrel 11 as will be described later. Output rotation of a driving motor (not shown) is transmitted by a suitable gear train to the driving gear 15.

The flange 11*f* provided on the rear end of the first driving lens barrel 11 is formed on its inner peripheral surface with a transmission gear 11*d* in the form of an internal gear as shown in FIG. 3. An intermediate gear 16 supported on gear supporting disk 3 by a supporting pin 16*a* is engaged with transmission gear 11*d* as shown in FIG. 6. A first transmission gear 17 is engaged with intermediate gear 16. The first transmission gear 17 is fixed on a supporting pin 18*a* which is defined by an end of a coupling shaft 18 and extends through retaining disk 4 from the front so as to be rotatable integrally with coupling shaft 18. As will be apparent from FIGS. 1 and 2 as well as FIG. 4, coupling shaft 18 is provided with a second transmission gear 19 so as to be rotatable integrally with coupling shaft 18. To this end, for example, the coupling shaft 18 may be splined or formed along its outer peripheral surface with a pair of planar portions longitudinally extending in parallel to each other, on one hand, and a boss of the second transmission gear 19 is formed with an aperture corresponding to a cross section of coupling shaft 18, on the other hand. With such arrangement, second transmission gear 19 is not only rotatable integrally with coupling shaft 18, but also slidably movable relative to coupling shaft 18. The second transmission gear 19 is also rotatably supported between a rear end surface of a flange 20*b* formed on a rear end of a key member 20 and a gear retaining plate 19*a*. Key member 20 functions as a linearly movable member as will be described later in more detail.

Referring to FIGS. 1 and 2 as well as to FIG. 4, second transmission gear 19 is engaged with a follower gear 12*c* in the form of an internal gear which is, in turn, formed on an inner peripheral surface of second driving lens barrel 12 at its rear end. With such arrangement, rotation of the first driving lens barrel 11 is transmitted successively via transmission gear 11*d*, intermediate gear 16, first transmission gear 17, coupling shaft 18, and second transmission gear 19 to the follower gear 12*c*. As a result, the second driving lens barrel 12 is rotated. The direction in which second driving lens barrel 12 is rotated is opposite to the direction in which first driving lens barrel 11 is rotated. These components, i.e., transmission gear 11*d*, intermediate gear 16, coupling shaft 18, second transmission gear 19, and follower gear 12*c*, form together unique means for transmission of rotation.

As shown in FIG. 4, key member 20 comprises a cylindrical main body 20*a*, a flange 20*b* formed on a rear end of main body 20*a* to support second transmission gear 19, and a hook 21 rearwardly extending from flange 20*b* at an appropriate location. The main body 20*a* is adapted to be inserted into the second driving lens barrel 12. Hook 21 has its distal end bent downward so as to form a tongue 21*a*. This tongue 21*a* is engaged with a cam groove 22 formed in the inner peripheral surface of first driving lens barrel 11, as shown in FIG. 3. The cam groove 22 is configured so that, even when the first driving lens barrel 11 is rotated relative to the stationary lens barrel 2, tongue 21*a* may be linearly moved in parallel to the optical axis S. It should be understood that the cam groove 22 is formed in inner peripheral surface of the first driving lens barrel 11 radially outside female helicoid 11*a* formed in the same inner peripheral surface. The cam groove 22 preferably comprises a leading groove to facilitate its formation. In this case, the groove may be designed so that the groove has a lead corresponding to the amount by which the second driving lens barrel 12 is moved back and forth per each revolution of the first driving lens barrel 11.

Main body 20*a* of the key member 20 is formed with a guide slit 20*e* extending in the direction of the optical axis S. Correspondingly, an interlocking pin 32*a* radially extends outward from outer peripheral surface of a frame 32 serving to hold a rear lens group 31 and loosely extends through guide slit 20*e*. With such arrangement, the rear lens group 31 can be operatively associated with the key member 20 and thereby slidably moved in the direction of the optical axis S relative to key member 20. A distal end of interlocking pin 32*a* extending through guide slit 20*e* is operatively associated with a cam groove (not shown) formed in the inner peripheral surface of the second driving lens barrel 12 to guide the rear lens group 31. Specifically, as the second driving lens barrel 12 rotates, the rear lens group holding frame 32 having interlocking pin 32*a* is guided by guide slit 20*e* to move in parallel to the optical axis S over a distance regulated by the cam groove. The rear lens group holding frame 32 is provided on its outer peripheral surface with a pair of radial projections 32*b* and correspondingly gear supporting disk 3 is provided with a pair of pawls 3*f*. A pair of tension springs are suspended between projections 32*b* and pawls 3*f*, respectively, to bias the interlocking pin 32*a* in close contact with a side wall of cam groove for the rear lens group 31.

Movable lens barrel 13 is formed on its inner peripheral surface with guide ribs 13*c* extending in parallel to the optical axis S over an appropriate length. Correspondingly, cylindrical main body 20*a* of the key member 20 is formed with guide slits 20*c* extending in parallel to the optical axis S. Guide ribs 13*c* are loosely engaged with the respective guide slits 20*c* so that the movable lens barrel 13 may be slidably guided by the key member 20 in parallel to the optical axis S.

A front lens group 34 is contained in a shutter unit 33 which is held by movable lens barrel 13 so that front lens group 34 may be moved together with the movable lens barrel 13 in parallel to the optical axis S. The unique configuration of the cam groove for the rear lens group 31 formed in the inner peripheral surface of the second driving lens barrel 12 assures that the front lens group 34, which moves back and forth in parallel to the optical axis S together with the movable lens barrel 13, always maintains a predetermined optical relationship with the rear lens group 31, which moves back and forth in parallel to the optical axis S under the guidance by the cam groove. Key member 20 is positioned, as shown in FIGS. 1 and 2, within a gap defined between the shutter unit 33 and the inner peripheral surface of the movable lens barrel 13. Lead wires 35 connected to shutter unit 33, as shown in FIGS. 1 and 2, extend rearward from shutter unit 33, then are curved forward to a front end of the key member 20 at which lead wires 35 are folded back and extend rearward. Then the lead wires 35 are guided by a guide notch 3e formed in gear supporting disk 3 as shown in FIG. 3 toward the camera body 1 and are connected to a control circuit such as a CPU. A front cover frame 36 is fixed to a forward end of the movable lens barrel 13 containing therein the front lens group 34.

Decorative rings 11e and 12d are mounted on front ends of the first driving lens barrel 11 and the second driving lens barrel 12, respectively, as shown in FIGS. 3 and 4.

The driving mechanism for photographic lens described hereinabove as a specific embodiment of the invention operates in a manner as will be described below.

In a state as shown by FIG. 2, the first driving lens barrel 11 has moved back relative to the stationary lens barrel 2, the second driving lens barrel 12 has moved back relative to first driving lens barrel 11, and the movable lens barrel 13 has moved back relative to second driving lens barrel 12. Upon energization of the driving motor (not shown), the output rotation thereof is transmitted through driving gear 15 and then input gear 14 to the gear 11c of the first driving lens barrel 11 and thereby first driving lens barrel 11 is rotated around the optical axis S relative to the stationary lens barrel 2. As the first driving lens barrel 11 is operatively associated with the stationary lens barrel 2 by the helicoids 11b and 2a, first driving lens barrel 11 moves forward relative to stationary lens barrel 2. It should be understood that a direction in which the first driving lens barrel 11 rotates with a result of moving forward is defined here as the forward direction. Such forward movement of the first driving lens barrel 11 causes no disengagement between the input gear 14 and the driving gear 15, since driving gear 15 has a face width sufficiently large in the direction of the optical axis S. Rotation of the first driving leans barrel 11 is transmitted by the transmission gear 11d and then the intermediate gear 16 to the first transmission gear 17 which is thereby rotated in the opposite direction with respect to first driving lens barrel 11. Second transmission gear 19 is fixed on the end of the coupling shaft 18 opposite to its end on which first transmission gear 17 is fixed and this second transmission gear 19 is rotated integrally with coupling shaft 18. Follower gear 12c of the second driving lens barrel 12 is engaged with second transmission gear 19 to rotate second driving lens barrel 12 around the optical axis S in the opposite direction with respect to the first driving lens barrel 11. In other words, second driving lens barrel 12 is rotated relative to the first driving lens barrel 11. Barrels 11 and 12 are operatively associated with each other by the helicoids 11a and 12b and, in consequence, the second driving lens barrel 12 is moved forward relative to the first driving lens barrel 11.

Rotation of the first driving lens barrel 11 in the forward direction causes the tongue 21a to be linearly moved forward in parallel to the optical axis S along the cam groove 22 formed in the inner peripheral surface of first driving lens barrel 11. Accordingly, the key member 20 provided with this tongue 21a is moved forward in parallel to the optical axis S. If the cam groove 22 is formed by a leading groove having a lead corresponding to an amount by which the second driving lens barrel 12 is linearly moved per each revolution of second driving lens barrel 12 relative to the first driving lens barrel 11, the key member 20 will be moved forward synchronously with second driving lens barrel 12. In this manner, the second transmission gear 19 adapted to be slidably moved relative to the coupling shaft 18 is not to be disengaged from the follower gear 12c even when the second driving lens barrel 12 is moved forward relative to the first driving lens barrel 11.

Key member 20 serves to guide the movable lens barrel 13 which is, in turn, operatively associated with the second driving lens barrel 12 by the helicoids 12a and 13b, so movable lens barrel 13 is moved forward in parallel to the optical axis S without being rotated around the optical axis S. With such arrangement, rotation of the first driving lens barrel 11 in the forward direction causes this lens barrel 11 to be moved forward relative to the stationary lens barrel 2, simultaneously causes the second driving lens barrel 12 to be rotated in the opposite direction and thereby to be moved forward relative to the first driving lens barrel 11, and consequently causes the movable lens barrel 13 to be moved forward relative to second driving lens barrel 12.

The front lens group 34 is moved forward together with the movable lens barrel 13, since front lens group 34 is held by movable lens barrel 13. The holding frame 32 for the rear lens group 31 is moved forward describing a predetermined locus as the second driving lens barrel 12 is rotated, since the interlocking pin 32a thereof is guided by the guide slit 20e formed in the key member 20 and the cam groove (not shown) for the rear lens group 31 formed in the inner peripheral surface of the second driving lens barrel 12. A predetermined optical relationship is maintained during such movement of these two lens groups 34 and 31, and therefore, a focal distance of the photographic lens comprising these two lens groups 34 and 31 is continuously varied. The lens barrels 11, 12, and 13 and the lens groups 31 and 34 are thus moved forward to their foremost positions for effective photographing, as shown by FIG. 1.

To move back the lens barrels 11, 12, and 13 from their positions shown in FIG. 1, the output shaft of the driving motor (not shown) may be rotated so as to rotate the first driving lens barrel 11 in the direction reverse to the case as has been described above. Such rotation of the first driving lens barrel 11 causes the second driving lens barrel 12 to be rotated forward. Consequently, the respective components are moved in the direction reverse to the previously-mentioned case. More specifically, the first driving lens barrel 11 is moved back relative to the stationary lens barrel 2, the second driving lens barrel 12 is moved back relative to first driving lens barrel 11, and the movable lens barrel 13 is moved back relative to second driving lens barrel 12. Synchronously with the backward movement of second driving lens barrel 12, the key member 20 is moved back, the front lens group 34 is moved back together with the movable lens barrel 13, and the rear lens group 31 is moved back along the cam groove (not shown) formed in the inner peripheral surface of the second driving lens barrel 12 to guide this lens group 31, respectively, to their positions shown by FIG. 2. During this backward movement, a predetermined optical relationship is also maintained between the front lens group 34 and the rear lens group 31.

While the driving mechanism of the invention has been described as the respective lens barrels 11, 12, and 13 are operatively associated with one another by the helicoids to be moved back and forth, it is also possible to drive the respective lens barrels 11, 12, and 13 by cam means so far as there is provided an arrangement adapted for linearly driving the key member 20 along the cam groove formed in the inner peripheral surface of the first driving lens barrel 11 to guide the rear lens group 31.

While the specific embodiment has been described hereinabove so that the first and second driving lens barrels 11 and 12 are rotated in opposite directions in order to achieve a relative rotation of these driving lens barrels 11 and 12, such relative rotation of these driving lens barrels 11 and 12 can be achieved also by rotating them in the same direction.

For example, the transmission gear 11d of the first driving lens barrel 11 may be directly engaged with the first transmission gear 17 without the aid of intermediate gear 16 to rotate the first and second driving lens barrels 11 and 12 in the same direction and a velocity ratio over an extent defined between the transmission gear 11d, and the follower gear 12c of the second driving lens barrel 12 may be appropriately selected to rotate the first and second driving lens barrels 11 and 12 in a same direction and relative to each other.

As will be apparent from the foregoing description, the inventive driving mechanism for photographic lens is so arranged that the key member that guides a linear movement of the movable lens barrel, is operatively associated with the first driving lens barrel and thereby the movable lens barrel is moved back and forth in operative association with the first driving lens barrel in parallel to the optical axis without being rotated around the optical axis. With such a unique arrangement, the first driving lens barrel contains therein only the means adapted to be interlocked with the first driving lens barrel. In a consequence, the number of parts lying adjacent the plane of photographic film can be minimized and thereby undesirable flare can be avoided.

The inventive driving mechanism requires no part to support the key member. This means that there is neither part which is problematic from the viewpoint of a strength nor part which is possibly damaged due to fatigue.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

I claim:

1. A driving mechanism for a photographic lens of a photographic optical system to move the photographic lens back and forth in parallel to an optical axis for power variation or focusing, said driving mechanism comprising:
    a stationary lens barrel;
    a first driving lens barrel telescopically received by said stationary lens barrel so as to be moved back and forth relative to said stationary lens barrel in parallel to the optical axis as said first driving lens barrel is rotated around the optical axis;
    a second driving lens barrel telescopically received by said first driving lens barrel so as to be rotated around the optical axis under a moment of rotation provided from said first driving lens barrel, thereby to be moved back and forth relative to said first driving lens barrel and to move a rear lens group back and forth in parallel to the optical axis by a predetermined distance;
    a linearly movable member operatively associated with said first driving lens barrel so as to be moved back and forth together with said second driving lens barrel in parallel to the optical axis without being rotated;
    rotation transmitting means serving to transmit a rotation of said first driving lens barrel to said second driving lens barrel; and
    a movable lens barrel telescopically received by said second driving lens barrel and adapted to be guided in operative association with said linearly movable member so as to be moved back and forth together with a front lens group in parallel to the optical axis by a predetermined distance as said second driving lens barrel is rotated.

2. The driving mechanism for photographic lens according to claim 1, wherein helicoids are used for operative association between said stationary lens barrel and said first driving lens barrel, between said first driving lens barrel and said second driving lens barrel and between said second driving lens barrel and said movable lens barrel, respectively.

3. The driving mechanism for photographic lens according to claim 2, wherein said first driving lens barrel includes cam means formed in its inner peripheral surface and said linearly movable member is provided with an interlocking member adapted to be operatively associated with said cam means so that said interlocking member is guided by said cam means and thereby said linearly movable member is moved back and forth in parallel to the optical axis.

4. The driving mechanism for photographic lens according to claim 3, wherein said cam means is provided in the form of a leading groove.

5. The driving mechanism for photographic lens according to claim 4, wherein the groove defining said cam means is formed so as to be deeper than a female helicoid formed in an inner peripheral surface of said first driving lens barrel.

6. The driving mechanism for photographic lens according to claim 5, wherein said rotation transmitting means causes said second driving lens barrel to be rotated in a direction opposite to the direction in which said first driving lens barrel is rotated.

7. The driving mechanism for photographic lens according to claim 6, wherein said rotation transmitting means comprises:
    an internal gear formed in an inner surface of said first driving lens barrel;
    a first transmission gear operatively associated with said internal gear via an intermediate gear;
    a second transmission gear provided coaxially with said first transmission gear so as to be rotated synchronously with said first transmission gear; and
    an internal gear formed in an inner surface of said second driving lens barrel so as to be engaged with said second transmission gear.

8. The driving mechanism for photographic lens according to claim 1, wherein said first driving lens barrel includes cam means formed in its inner peripheral surface and said linearly movable member is provided with an interlocking member adapted to be operatively associated with said cam means so that said interlocking member is guided by said cam means and thereby said linearly movable member is moved back and forth in parallel to the optical axis.

9. The driving mechanism for photographic lens according to claim 8, wherein said cam means is provided in the form of a leading groove.

10. The driving mechanism for photographic lens according to claim 9, wherein the groove defining said cam means is formed so as to be deeper than a female helicoid formed in an inner peripheral surface of said first driving lens barrel.

11. The driving mechanism for photographic lens according to claim 10, wherein said rotation transmitting means causes said second driving lens barrel to be rotated in a direction opposite to the direction in which said first driving lens barrel is rotated.

12. The driving mechanism for photographic lens according to claim 11, wherein said rotation transmitting means comprises:
    an internal gear formed in an inner surface of said first driving lens barrel;

a first transmission gear operatively associated with said internal gear via an intermediate gear;

a second transmission gear provided coaxially with said first transmission gear so as to be rotated synchronously with said first transmission gear; and an internal gear formed in an inner surface of said second driving lens barrel so as to be engaged with said second transmission gear.

13. The driving mechanism for photographic lens according to claim 1, wherein said rotation transmitting means causes said second driving lens barrel to be rotated in a direction opposite to the direction in which said first driving lens barrel is rotated.

14. The driving mechanism for photographic lens according to claim 1, wherein said rotation transmitting means comprises:

an internal gear formed in an inner surface of said first driving lens barrel;

a first transmission gear operatively associated with said internal gear via an intermediate gear;

a second transmission gear provided coaxially with said first transmission gear so as to be rotated synchronously with said first transmission gear; and an internal gear formed in an inner surface of said second driving lens barrel so as to be engaged with said second transmission gear.

15. The driving mechanism for photographic lens according to claim 2, wherein said rotation transmitting means causes said second driving lens barrel to be rotated in a direction opposite to the direction in which said first driving lens barrel is rotated.

16. The driving mechanism for photographic lens according to claim 2, wherein said rotation transmitting means comprises:

an internal gear formed in an inner surface of said first driving lens barrel;

a first transmission gear operatively associated with said internal gear via an intermediate gear;

a second transmission gear provided coaxially with said first transmission gear so as to be rotated synchronously with said first transmission gear; and an internal gear formed in an inner surface of said second driving lens barrel so as to be engaged with said second transmission gear.

17. The driving mechanism for photographic lens according to claim 3, wherein said rotation transmitting means causes said second driving lens barrel to be rotated in a direction opposite to the direction in which said first driving lens barrel is rotated.

18. The driving mechanism for photographic lens according to claim 3, wherein said rotation transmitting means comprises:

an internal gear formed in an inner surface of said first driving lens barrel;

a first transmission gear operatively associated with said internal gear via an intermediate gear;

a second transmission gear provided coaxially with said first transmission gear so as to be rotated synchronously with said first transmission gear; and an internal gear formed in an inner surface of said second driving lens barrel so as to be engaged with said second transmission gear.

19. The driving mechanism for photographic lens according to claim 4, wherein said rotation transmitting means causes said second driving lens barrel to be rotated in a direction opposite to the direction in which said first driving lens barrel is rotated.

20. The driving mechanism for photographic lens according to claim 4, wherein said rotation transmitting means comprises:

an internal gear formed in an inner surface of said first driving lens barrel;

a first transmission gear operatively associated with said internal gear via an intermediate gear;

a second transmission gear provided coaxially with said first transmission gear so as to be rotated synchronously with said first transmission gear; and an internal gear formed in an inner surface of said second driving lens barrel so as to be engaged with said second transmission gear.

* * * * *